(No Model.)
L. G. REYNOLDS.
METHOD OF CHECKING AND REGISTERING BAGGAGE.
No. 314,215. Patented Mar. 17, 1885.
Fig 1.
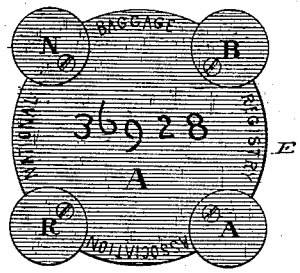
Fig 2.
| Year | Mo. | Day | Number of check | Name of Owner | Address | Town |
|---|---|---|---|---|---|---|
| 1882 | Oct | 10 | 36.928 | R P Kennedy | 1001 Col. St | Bellefontaine. O. |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
From 36928 A.    To 36978 A.
Fig 3.
Registered
With the National Baggage Registry Association, N.Y.
Witnesses:
Jacob Stough
C. D. Campbell
Inventor:
L. G. Reynolds

UNITED STATES PATENT OFFICE.

LEWIS G. REYNOLDS, OF DAYTON, OHIO.

METHOD OF CHECKING AND REGISTERING BAGGAGE.

SPECIFICATION forming part of Letters Patent No. 314,215, dated March 17, 1885.

Application filed October 25, 1882. (No model.)

*To all whom it may concern:*

Be it known that I, LEWIS G. REYNOLDS, a citizen of the United States, and a resident of Dayton, in the county of Montgomery and State of Ohio, have invented a new and useful Method of Registering and Checking Baggage, of which the following is a specification.

My invention is a new method or system for the protecting of baggage from fraudulent delivery, for discovering or ascertaining the ownership, and of its recovery when lost or estray; and it consists in the secret registration of an arbitrary designating-mark and of the owner's name and address, of a permanent corresponding mark on the baggage, and another corresponding mark to be held by the owner. My object is to furnish better protection to railroad companies and the traveling public against the loss of baggage and the fraudulent checking or withdrawing from check of baggage or other articles by any one but the owner of the same or his authorized agent; to insure against the actual loss of baggage, except such as may be deliberately stolen or burned or wrecked; to make it impossible for any one but the owner of the baggage or his authorized agent to withdraw same from check; to facilitate the work of finding the owner of unclaimed or unmarked baggage; to make it impossible for one party to change the checks from a worthless piece of baggage to a valuable one, and be able to withdraw same from check at its destination; to make it impossible for one party to check a registered article that does not belong to him.

My plan of operation is very simple, and consists of the use of my "attaching and fac-simile checks," some of which are attached permanently to the trunk or article to be checked in as conspicuous and safe a place as possible. Another one (or more) fac-simile of the attaching-checks is carried by the owner of the registered article, to exhibit when checking or withdrawing from check his trunk or other registered article, and the check on the trunk and the check exhibited must correspond. When a sale of a set of fac-simile checks is made at a railroad-station or any point other than the main office, a memorandum of sale is immediately forwarded to the main office for registry, giving the address and name of party purchasing, with date of sale, number of check, &c. All sales are immediately recorded in the registry-book, and the purchaser provided with a full set of checks, and also with gummed slips, bearing the words "Registered With the National Baggage Registry Association," to fasten upon his trunk in a conspicuous place, so that it may be seen at a glance that the trunk or other article is a registered one. Should a registered article become misplaced, mischecked, lost, or sent to the wrong destination, the baggage-man receiving the same will, on finding out or suspecting such an occurrence, write to the main office that a registered article, describing the check attached thereto, is at his station. Word will be at once sent from the main office to the address of the owner of said registered check that his trunk is at the station from which the notification came, awaiting his orders.

In Figure 1, E is a view of the check used to fasten upon a trunk by clinch-nails, screws, or other permanent fastening.

In Fig. 2, F is a view of a copy of a page from register.

In Fig. 3, G is a view of the gummed slip to be fastened on the registered article.

Below I give an example which further illustrates the working of my plan. Example: R. P. Kennedy is traveling to New York with registered baggage—a valuable trunk. He checks it at Dayton, Ohio, to its destination. John Smart is on the same train with a worthless trunk checked to Columbus, Ohio. When the train arrives at Xenia, and the baggage is awaiting transfer to the main line of the Pennsylvania road, Smart finds an opportunity to change checks from his trunk to Kennedy's and from Kennedy's to his. Arriving at Columbus, he sees Kennedy's trunk put off, and, exhibiting his railroad-check, claims the baggage. The baggage-man sees it is a registered article, and asks Mr. Smart to produce his fac-simile check, which, of course, he cannot do, and does not get the trunk. Baggage-man at once notifies central office N. B. R. A. that registered trunk 36,928A is lying in his possession. We immediately notify Kennedy's family at Dayton, Ohio, that his trunk is at Columbus; or, in the meantime Kennedy has arrived in New York, learned his loss, placed the facts before the proper parties, and they have traced the trunk to Columbus themselves.

By my method as above set forth much time, expense, and anxiety are saved in case one's baggage gets astray, and a great feeling of security will be felt that impostors cannot get possession of it. The fact of a number or mark being on it, which rogues shall recognize as a registered one, and especially if the word "Registered" be displayed on it, will make this very mark or check alone one of the best safeguards and protections against fraudulent checking, fraudulent withdrawing from check, or fraudulent changing of checks, for the rogue acquainted with the method would not dare to attempt the fraud, because of the certainty of detection, and any one ignorant of the method could get no further than to make the attempt.

In the event of the loss of a piece of baggage under the system now in vogue the loser must send to the proper authority an accurate description of the lost article, giving size, material, and general appearance when last seen. The search then begins, and there is great loss of time and convenience, especially if the owner be a traveling salesman, for the search is a wild one, as there is no clue as to where the trunk lies, and there is no assurance that it will ever be found. With my method, however, the correspondence, if any, would consist merely in sending a notification by the baggage-man in whose hands the stray baggage might be to the registry-office, giving simply the number stamped on the check. A reference to the register would be all that would be needed to enable the officials to restore the baggage to the owner. Hundreds and thousands of trunks and of traveling-bags are of the same size and pattern, and are made at the same factory. It often occurs that two or more exactly answer the same general description. In such case the baggage-man is as likely to deliver the wrong as the right one; but with my method this could not occur. He is, also, under the existing system, constantly delivering to the wrong party, having no possible means for ascertaining or identifying the real owner or honest claimant; but with my system this is positively prevented.

I do not claim the permanent marks as new, nor the record or registry book, but only that these are used in the new art or method of protecting baggage.

What I do claim, and desire to secure by Letters Patent, is—

The within-described method of securing safe transportation and delivery of baggage to rightful owners, consisting in registering a number or mark for the same, with the name and address of the owner, the permanently attaching to the article of baggage such registration number or mark, and furnishing the owner with a duplicate of such registration number or mark, all substantially as set forth.

LEWIS G. REYNOLDS.

Attest:
JACOB STOUGH,
C. D. CAMPBELL.